United States Patent
Liu

(10) Patent No.: US 7,477,667 B2
(45) Date of Patent: Jan. 13, 2009

(54) PRACTICAL APPROACH FOR ONE MJ FEMTOSECOND FIBER LASER

(75) Inventor: Jian Liu, Sunnyvale, CA (US)

(73) Assignee: Polar Onyx, Inc., Sunnyvale, CA (US)

( * ) Notice: Subject to any disclaimer, the term of this patent is extended or adjusted under 35 U.S.C. 154(b) by 0 days.

(21) Appl. No.: 11/701,296

(22) Filed: Jan. 31, 2007

(65) Prior Publication Data

US 2007/0177640 A1   Aug. 2, 2007

Related U.S. Application Data

(60) Provisional application No. 60/765,599, filed on Feb. 2, 2006.

(51) Int. Cl.
*H01S 3/10* (2006.01)
(52) U.S. Cl. .................... 372/25; 372/6; 372/28
(58) Field of Classification Search ............ 372/6, 372/18, 25
See application file for complete search history.

(56) References Cited

U.S. PATENT DOCUMENTS

2007/0171945 A1 *   7/2007   Liu et al. ................. 372/6

* cited by examiner

*Primary Examiner*—Dung T Nguyen
(74) *Attorney, Agent, or Firm*—Xin Wen

(57) ABSTRACT

A fiber Chirped Pulse Amplification (CPA) laser system includes a fiber mode-locking oscillator for generating a laser and stretching into a few hundreds ps-10 ns pulse by a fiber stretcher for projecting into an acoustic-optic (AO) functioning as a pulse picker for generated a modulated laser with a reduced repetition rate for projecting to a multiple stage amplifier. The multiple stage amplifier further includes a first high-energy amplifier implemented with a large mode area (LMA) fiber for amplifying the modulated laser up to a uJ level laser and a second amplifier implemented with a PCF based Yb doped fiber to further amplify the uJ level laser to a mJ level laser.

20 Claims, 2 Drawing Sheets

PRACTICAL APPROACH FOR ONE MJ FEMTOSECOND FIBER LASER

This Formal application claims a Priority Date of Feb. 2, 2006 benefit from a Provisional Patent Application 60/765,599 filed by the one common Inventor of this application. The disclosures made in 60/765,599 are hereby incorporated by reference in this patent application.

FIELD OF THE INVENTION

The present invention relates generally to apparatuses and methods for providing fiber laser system. More particularly, this invention relates a system configuration for providing a practical approach to provide a femtosecond fiber laser with one mJ level of energy.

BACKGROUND OF THE INVENTION

Even though current technologies of fiber laser have made significant progress toward achieving a compact and reliable fiber laser system providing high quality output laser with ever increasing output energy, however those of ordinary skill in the art are still confronted with technical limitations and difficulties. Specifically, in a fiber laser system implemented with the Chirped Pulse Amplification (CPA) for short pulse high power laser amplifier, the fiber laser systems are still limited by the technical difficulties that 1 mJ high energy femtosecond fiber laser requires multiple improvements in terms of fiber design, high power amplification, nonlinear effects mitigation, and stretching and compression operations. There is a first challenge of the nonlinear effects. When the peak power goes up to 100 kW, strong nonlinear effects such as self phase modulation (SPM) and stimulated Raman scattering (SRS) cause more serious problems in depleting signal power in the high power fiber laser, even though a large mode area (LMA) fiber be used to reduce SRS/SPM and increase saturation power. Then, there is another challenge of a third order dispersion (TOD). Due to a higher stretching ratio involves in the chirped pulse amplification, higher order dispersion such as TOD has significant impact on the pulse quality and the pulse faces a challenge to compress efficiently below 200 fs after amplification. Thus the third order dispersion (TOD) limits the scalability of the laser systems. Also, there is another challenge due to a lower extraction. The Yb-doped fibers are low in extracting more power out of fiber. Higher doping concentration has to be used for the fiber laser. Furthermore, there is a challenge of configuring the compression stage due to longer stretched pulses (a few hundreds ps-10 ns). All these challenges require new and improved fiber laser systems to reliably and practically generate the femtosecond laser at an energy level substantially near a one-mJ level.

Therefore, a need still exists in the art of fiber laser design and manufacture to provide a new and improved configuration and method to provide fiber laser to compensate the dispersion generated in the laser system due to the TOD effects such that the above-discussed difficulty may be resolved.

SUMMARY OF THE PRESENT INVENTION

It is therefore an aspect of the present invention to provide a laser system wherein the laser transmission is provided to take advantage of the SPM to broaden the spectrum in the amplification stage such that the above-discussed difficulties of spectral narrowing effect during the pulse amplifications as that encountered in the prior art may be resolved.

Another aspect of this invention is to provide a laser system with an amplification stage that the spectrum is amplified without affecting the original pulse width instead of narrowing the pulse width due to limited gain bandwidth. Therefore, the gain of the amplifier has sufficient width to support the broadened spectrum by the SPM.

Another aspect of this invention is to provide a fiber laser system wherein the last amplifier is a photonic crystal fiber (PCF) amplifier and implementing a dispersion management stretching fiber and using a photonics bandgap fiber (PBF) for dechirping and compressing the pulse and reducing the third order dispersion (TOD).

Briefly, in a preferred embodiment, the present invention discloses a fiber Chirped Pulse Amplification (CPA) laser system that includes a fiber mode-locking oscillator for generating a laser for projecting to an acoustic-optic (AO) functioning as a pulse picker for generated a modulated laser with a reduced repetition rate for projecting to a multiple stage amplifier. The multiple stage amplifier further includes a first high-energy amplifier implemented with a large mode area (LMA) fiber for amplifying the modulated laser up to a uJ level laser and a second amplifier implemented with a PCF based Yb doped fiber to further amplify the uJ level laser to a mJ level laser.

In an exemplary embodiment, this invention further discloses a method of generating a mJ (millie-Joule) level femtosecond (fs) fiber laser. The method includes a step of generating a laser from a fiber mode-locking oscillator for projecting to an acoustic-optic (AO) functioning as a pulse picker for generating a modulated laser with a reduced repetition rate for projecting to a multiple stage amplifier. The method further includes a step of amplifying the modulated laser up to a mJ level laser by a first high-energy amplifier implemented with a large mode area (LMA) fiber and further amplifying the mJ level laser to an output power over 10 W and an energy over 2 mJ with femtosecond pulses through a second amplifier implemented with a PCF based Yb doped fiber. In an exemplary embodiment, the step of generating a laser from a fiber mode-locking oscillator further comprising a step of generating the laser from a mode locked femtosecond fiber laser operating at 1060 nm spectral region and with a pulse width of 100 fs. In another exemplary embodiment, the step of reducing a repletion rate of a modulated laser is a step of reducing a repetition rate of the modulated laser from 10's MHz to 10's kHz. In another exemplary embodiment, the step of projecting the modulate laser into the multiple-stage amplifier further comprising step of projecting the modulated laser to a low energy fiber amplifier at a µJ level. In another exemplary embodiment, the method further includes a step of stretching a pulse width of the laser through a stretching stage implemented with a fiber based dispersion management stretcher and dechirping said laser pulses and reducing a third order dispersion (TOD) through a compressor implemented with a photonics bandgap fiber (PBF) or a pair of gratings.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
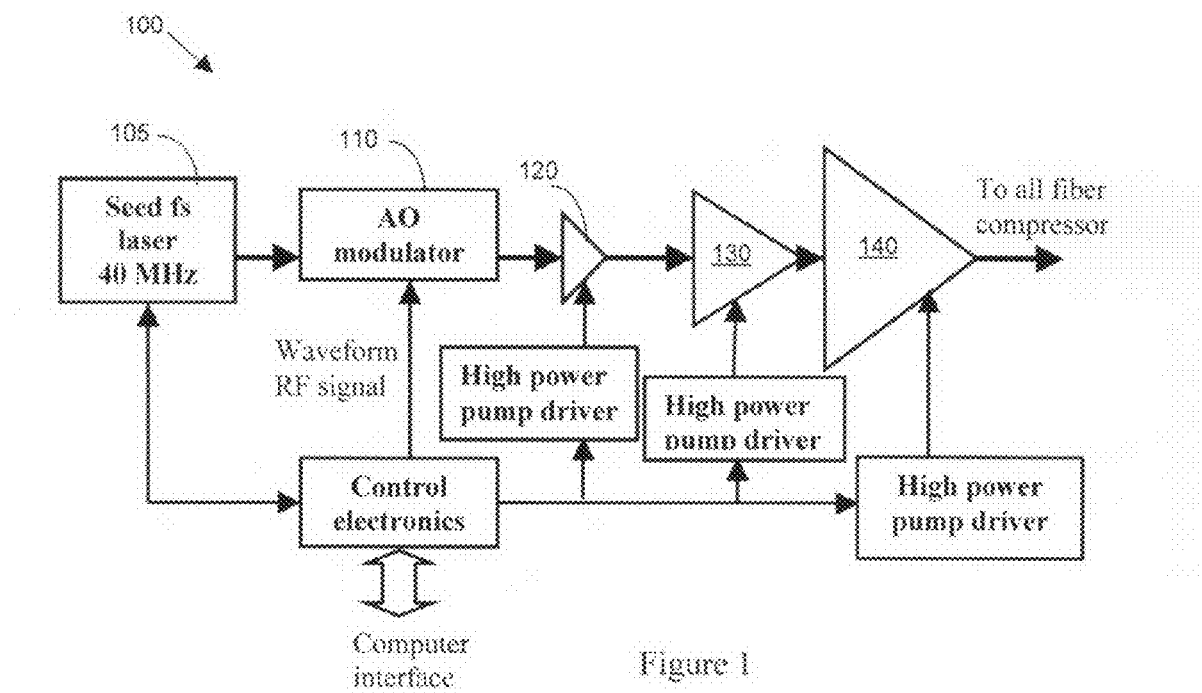
FIG. 1 is a functional block diagram for showing a fiber laser system implemented with a multiple amplifiers with last amplifier using a PCF amplifier and implementing a dispersion management stretching fiber and using a PBF or a grating pair for dechirping and compressing the pulse and reducing the third order dispersion (TOD).

Referring to FIG. 1 for a schematic diagram of an mJ (millie-Joule) level femtosecond (fs) fiber laser system 100 of this invention. The laser system 100 includes a laser seed 105 for generating a seed laser. The seed laser 105 is a mode locked femtosecond fiber laser operating at 1060 nm spectral region and with a compressable pulse width of 100 fs and stretching into a few hundreds ps-10 ns pulse by a fiber stretcher (not shown) and projecting into an acoustic-optic (AO) modulator 110. The AO modulator 110 functions as a pulse picker for reducing the repetition rate from 40 MHz to 10's kHz to 100's kHz. The laser modulated by the AO modulator 110 is then projected to one low energy fiber amplifier 120 at a µJ level and a high energy fiber amplifier 130 at an energy of mJ level. Optionally, there may be two high-energy amplifiers. The higher energy amplifier 130 delivers an output power over 1 W and energy over 200 µJ femtosecond pulses. The amplified laser is then transmitted to last energy amplifier 140 to generate amplified pulse with energy over 1 mJ and average power over 10 W that is further projected to compressor stage that is not specifically shown. The last amplifier 140 is a photonic crystal fiber (PCF) amplifier.

Figure 1A:
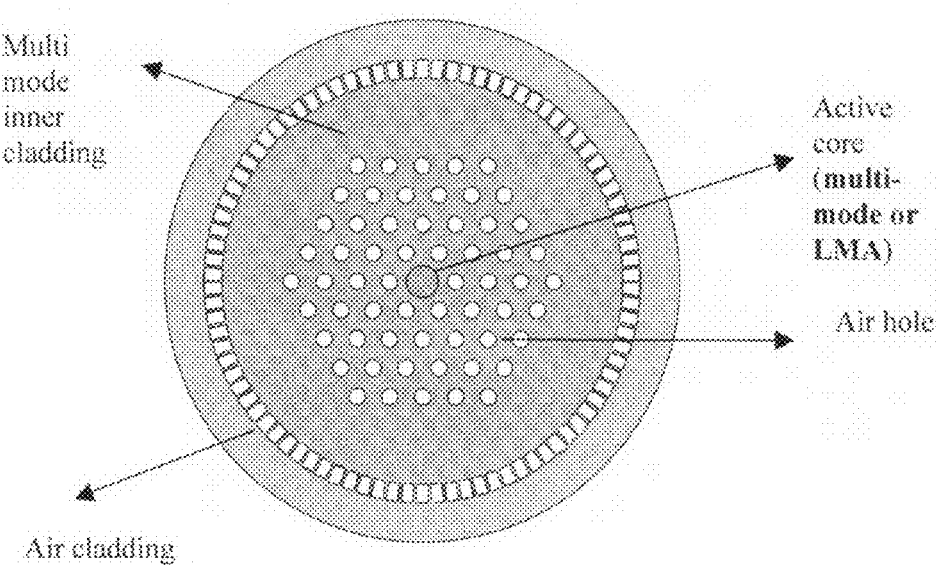
FIG. 1A is a side cross sectional view of a DC PCF fiber structure with active LMA or multi mode core.

Amplification of the pulses can be achieved by using a short piece of high concentration double cladding Yd-doped phtonics crystal fiber (PCF) with large mode area (LMA or multi mode) as shown in FIG. 1A The LMA or multimode structure of core of the DCYDF combined with short length help reduce the nonlinear effects such as SPM and SRS. When the core diameter is 60 µm, a stretched pulse with hundreds of ps pulse width can usually be amplified to mJ level without any self focusing issue (self focusing is a fundamental limit for fiber laser in high peak power operation). Furthermore, When the core diameter can be increased to 200 µm, a stretched pulse with tens of ns pulse width can usually be amplified to tens of mJ without any self focusing issue (self focusing is a fundamental limit for fiber laser in high peak power operation).

The stretching stage is implemented with a fiber based dispersion management stretcher which will be described in details later. The compression is implemented with a photonics bandgap fiber (PBF) for dechirping the pulse and reducing the third order dispersion (TOD) or a pair of gratings as described in patent application 60/696,372. The details of the stretching stage and the compression fiber have also been disclosed in Patent Applications 60/696,372, 60/696,275, 60/713,653 and are hereby incorporated by reference in this patent application. By using PBF in the compression stage 160, a truly all fiber solution is provided for the high-energy fiber laser without any discrete free space components.

Figure 2:
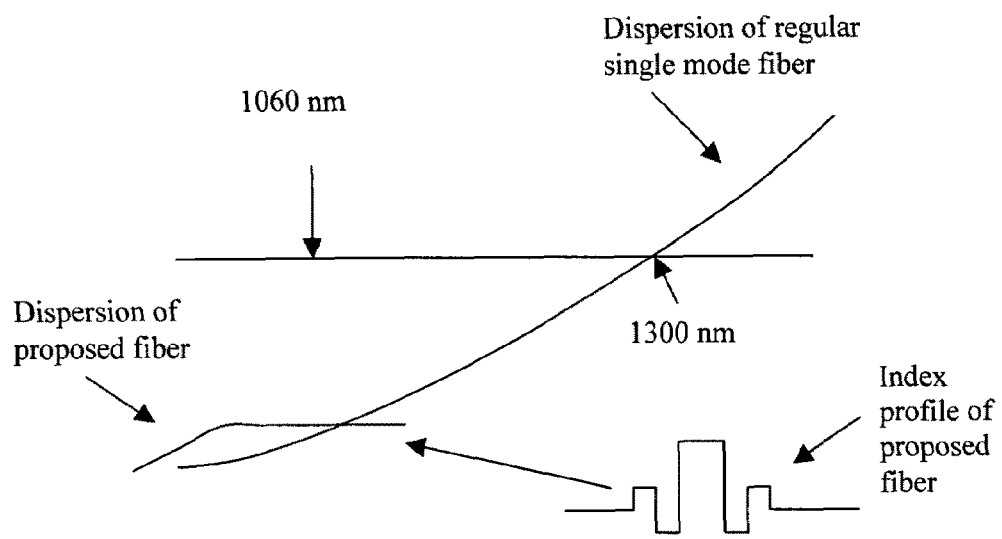
FIG. 2 shows a diagram of fiber dispersion and index profile of the fiber of this invention to reduce the TOD.

For the stretcher, a special design is implemented that has a flat dispersion over the range of 1020-1090 nm, similar to that dispersion flattened fiber used in 1550 nm spectral band by using a depressed cladding structure. FIG. 2 shows an example of the index profile for this type of fiber and possible flattened dispersion at 1060 spectral band. Basically, the dispersion in the fiber is controlled by both material dispersion and waveguide dispersion. At the 1020-1090 nm spectral region, material dispersion shows a positive dispersion slope. With traditional fiber design such as that for SM 28, the dispersion slope always show a positive number around 0.3 ps/nm^2.km. However, by manipulating the fiber waveguide structure (e.g. depressed cladding structure as shown in FIG. 2), the waveguide dispersion can be introduced in modification of the material dispersion to obtain the expected dispersion and dispersion slope. The depressed cladding structure can be technically achieved by varying the doping when making the fiber platform layer by layer. By doping Ge, the refractive index can be raised and by doping fluoride, the refractive index can be reduced.

The high-power amplifier stage is implemented with two high power amplifiers 120 and 130, the first amplifier 120 is implemented with a large mode area (LMA) fiber to amplify the stretched pulse (a few hundreds ps-10 ns) to 100 uJ level. The second amplifier 130 is implemented with a PCF based Yb doped fiber, also referenced to as an air cladding fiber to further amplify the pulses to over 2 mJ.

Figure 3:
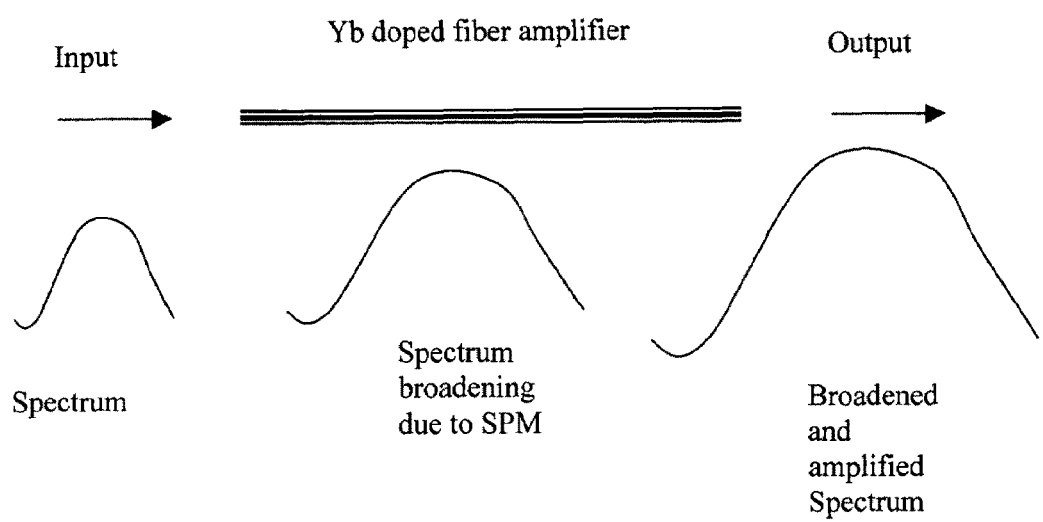
FIG. 3 is a diagram for showing the evolution of the pulse spectrum in Yb fiber at 1060 spectral band

The last stage amplifier 140 is designed to have certain level of SPM to broadening the spectrum wider than the original input and amplify it through the amplifier stage by taking advantage of the natural wide and flat gain bandwidth of Yb fiber operating around 1060 band. FIG. 3 illustrates the working principal. The input pulse with certain bandwidth of spectrum will get amplified in the Yb doped fiber amplifier and the spectrum will get broadened due to SPM. The broadened spectrum located within the gain spectrum of the Yb fiber amplifier so it can continue to be amplified and broadened further. This will significantly enable the reduction reduce of the length of compression stage using bulk gratings or the length of PBF (for all fiber solution since the compression length is inversely proportional to the pulse bandwidth.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A fiber Chirped Pulse Amplification (CPA) laser system, comprising:

a fiber mode-locking oscillator configured to generate a train of first laser pulses having a first pulse width at an input repetition rate;

a pulse stretcher configured to receive the train of first laser pulses to produce a train of stretched laser pulses having a second pulse width at least 1000 times of the first pulse width;

an acoustic-optic device configured to produce a modulated acoustic grating at a picking repetition rate lower than $1/100^{th}$ of the input repetition rate, wherein the modulated acoustic grating is configured to select one of the stretched laser pulses in the train of stretched laser pulses to produce a selected stretched laser pulse, wherein the selected stretched laser pulse has a pulse energy below 10 µJ;

a first high-energy amplifier constructed in a large mode area (LMA) fiber, wherein the first high-energy amplifier is configured to produce a first amplified pulse in response to the selected stretched laser pulse;

a second high-energy amplifier constructed in a Yb doped photonic crystal fiber (PCF) fiber, wherein the second high-energy amplifier is configured to produce a second amplified pulse in response to the first amplified pulse; and a compressor configured to compress the second amplified pulse to produce an output laser pulse shorter than the second amplified pulse, wherein the output laser pulse has a pulse energy above 1 mJ.

2. The fiber CPA laser system of claim 1, wherein the first pulse width is shorter than 200 fs, wherein the input repetition rate is more than 20 MHz.

3. The fiber CPA fiber laser system of claim 1, wherein the picking repetition rate is in a range from about 10 KHz and about 1000 KHz.

4. The fiber CPA laser system of claim 1, further comprising a low energy fiber amplifier configured to amplify the selected stretched laser pulse and project an amplified selected stretched laser pulse to the first high-energy amplifier.

5. The fiber CPA laser system of claim 1, wherein the output pulse is shorter than 200 fs.

6. The fiber CPA laser system of claim 1, wherein the second high-energy amplifier is configured to produce a train of second amplified pulses at a power more than 5 W.

7. The fiber CPA laser system of claim 1, wherein the second high-energy amplifier is configured to broaden the spectral width of the first amplified pulse to produce the second amplified pulse having an increased spectral band comparing to the first amplified pulse.

8. The fiber CPA laser system of claim 1, wherein the compressor is constructed in a photonics bandgap fiber (PBF) that is configured to dechirp the second amplified pulse to produce the output laser pulse having reduced third order dispersion (TOD) compared to the second amplified pulse.

9. The fiber CPA laser system of claim 8, wherein the pulse stretcher has a substantially unchanged or a negative dispersion a wavelength range in which the first laser pulses are spectrally distributed.

10. A fiber Chirped Pulse Amplification (CPA) laser system, comprising:
    a fiber mode-locking oscillator configured to generate a train of first laser pulses having a first pulse width at an input repetition rate;
    a pulse stretcher configured to receive the train of first laser pulses to produce a train of stretched laser pulses having a second pulse width at least 1000 times of the first pulse width;
    an acoustic-optic device configured to produce a modulated acoustic grating at a picking repetition rate lower than $1/100^{th}$ of the input repetition rate, wherein the modulated acoustic grating is configured to select one of the stretched laser pulses in the train of stretched laser pulses to produce a selected stretched laser pulse, wherein the selected stretched laser pulse has a pulse energy below 10 µJ;
    a first high-energy amplifier constructed in a large mode area (LMA) fiber, wherein the first high-energy amplifier is configured to produce a first amplified pulse in response to the selected stretched laser pulse;
    a second high-energy amplifier comprising:
        an active core configured to guide and amplify the first amplified pulse, wherein
        the active core has a core width wider than 60 µm;
        a Yb doped cladding surrounding the active core;
        an array of air holes in the Yb doped cladding; and
        an air cladding surrounding the Yb doped cladding, wherein the second high-energy amplifier is configured to produce a second amplified pulse in response to the first amplified pulse; and
    a compressor configured to compress the second amplified pulse to produce an output laser pulse shorter than the second amplified pulse, wherein the output laser pulse has a pulse energy above 1 mJ.

11. The fiber CPA laser system of claim 10, wherein the active core has a core width wider than 2000 µm, wherein the output laser pulse has a pulse energy above 10 mJ.

12. The fiber CPA laser system of claim 10, wherein the first pulse width is shorter than 200 fs, wherein the input repetition rate is more than 20 MHz.

13. The fiber CPA fiber laser system of claim 10, wherein the picking repetition rate is in a range from about 10 KHz and about 1000 KHz.

14. The fiber CPA laser system of claim 10, further comprising a low energy fiber amplifier configured to amplify the selected stretched laser pulse and project an amplified selected stretched laser pulse to the first high-energy amplifier.

15. The fiber CPA laser system of claim 10, wherein the output pulse is shorter than 200 fs.

16. The fiber CPA laser system of claim 10, wherein the second high-energy amplifier is configured to produce a train of second amplified pulses at a power more than 5 W.

17. The fiber CPA laser system of claim 10, wherein the second high-energy amplifier is configured to broaden the spectral width of the first amplified pulse to produce the second amplified pulse having an increased spectral band comparing to the first amplified pulse.

18. The fiber CPA laser system of claim 10, wherein the compressor is constructed in a photonics bandgap fiber (PBF) that is configured to dechirp the second amplified pulse to produce the output laser pulse having reduced third order dispersion (TOD) compared to the second amplified pulse.

19. A fiber Chirped Pulse Amplification (CPA) laser system, comprising:
    a fiber mode-locking oscillator configured to generate a train of first laser pulses having a first pulse width;
    a pulse stretcher configured to receive the train of first laser pulses to produce a train of stretched laser pulses having a second pulse width at least 1000 times of the first pulse width;
    an acoustic-optic device configured to produce a modulated acoustic grating configured to select one of the stretched laser pulses in the train of stretched laser pulses to produce a selected stretched laser pulse, wherein the selected stretched laser pulse has a pulse energy below 10 µJ;
    a control circuit configured to control the fiber mode-locking oscillator to generate the train of first laser pulses at an input repetition rate, wherein the control circuit is configured to control the acoustic-optic device to produce the modulated acoustic grating at a picking repetition rate lower than $1/100^{th}$ of the input repetition rate;
    a first high-energy amplifier constructed in a large mode area (LMA) fiber, wherein the first high-energy amplifier is configured to produce a first amplified pulse in response to the selected stretched laser pulse;
    a second high-energy amplifier comprising:
        an active core configured to guide and amplify the first amplified pulse, wherein
        the active core has a core width wider than 60 µm;
        a Yb doped cladding surrounding the active core;
        an array of air holes in the Yb doped cladding; and
        an air cladding surrounding the Yb doped cladding, wherein the second high-energy amplifier is configured to produce a second amplified pulse in response to the first amplified pulse; and a compressor configured to compress the second amplified pulse to produce an output laser pulse shorter than the second amplified pulse, wherein the output laser pulse has a pulse energy above 1 mJ.

20. The fiber CPA laser system of claim 19, further comprising:
a first pump driver configured to drive the first high-energy amplifier to produce the first amplified pulse in response to the selected stretched laser pulse; and
a second pump driver configured to drive the second high-energy amplifier to produce the second amplified pulse in response to the first amplified pulse, wherein the control circuit is configured to control the first pump driver and the second pump driver to enable the second amplified pulse to be produced in response to the selected stretched laser pulse.

* * * * *